(12) United States Patent
Chan et al.

(10) Patent No.: US 12,393,050 B2
(45) Date of Patent: Aug. 19, 2025

(54) FLOATING IMAGE DISPLAY DEVICE

(71) Applicant: Industrial Technology Research Institute, Hsinchu (TW)

(72) Inventors: Han-Sung Chan, New Taipei (TW); Yi-Hsiang Huang, Changhua County (TW); Chun-Ting Lin, Taipei (TW); Yu-Hsiang Liu, Chiayi (TW); Chia-Ping Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 156 days.

(21) Appl. No.: 17/865,421

(22) Filed: Jul. 15, 2022

(65) Prior Publication Data

US 2023/0288722 A1    Sep. 14, 2023

(30) Foreign Application Priority Data

Mar. 8, 2022 (TW) .................................. 111108367

(51) Int. Cl.
*G02B 30/56* (2020.01)
*G02B 17/00* (2006.01)
*G02B 17/06* (2006.01)
*G02B 17/08* (2006.01)

(52) U.S. Cl.
CPC ........... *G02B 30/56* (2020.01); *G02B 17/002* (2013.01); *G02B 17/0605* (2013.01); *G02B 17/0856* (2013.01)

(58) Field of Classification Search
CPC .. G02B 17/08; G02B 17/0605; G02B 17/002; G02B 5/32; G02B 30/40; G02B 30/56; G02B 27/0101
See application file for complete search history.

(56) References Cited

U.S. PATENT DOCUMENTS

| 3,647,284 | A | 3/1972 | Elings et al. |
| 6,196,690 | B1 | 3/2001 | Blackmon, Jr. |
| 8,210,694 | B1 * | 7/2012 | McClanahan ...... G02B 17/0605 359/861 |
| 2012/0223909 | A1 | 9/2012 | Tse et al. |

(Continued)

FOREIGN PATENT DOCUMENTS

| CN | 101843108 A * | 9/2010 | ......... G02B 27/2292 |
| CN | 107167991 | 9/2017 | |

(Continued)

*Primary Examiner* — Bumsuk Won
*Assistant Examiner* — Samanvitha Sridhar
(74) *Attorney, Agent, or Firm* — JCIPRNET (57) ABSTRACT

A floating image display device, configured to generate a floating image, is provided. The floating image display device includes an image module and at least one transflective optical element. The image module is configured to provide a first image. The transflective optical element includes a first reflective surface and a second reflective surface. The first image is located between the first reflective surface and the second reflective surface. Each of the first reflective surface and the second reflective surface includes a curved surface and has no opening on an optical axis thereof. The second reflective surface is a transflective surface. The first reflective surface and the second reflective surface are configured to re-converge rays from the first image to form a second image. The second image is a floating image.

17 Claims, 5 Drawing Sheets

(56) References Cited

U.S. PATENT DOCUMENTS

2014/0111479 A1    4/2014   Krah et al.
2017/0261758 A1    9/2017   Powell
2019/0011715 A1*   1/2019   Mashitani .......... G02B 17/0605
2023/0341703 A1*  10/2023   Niu .................... G02B 27/0966

FOREIGN PATENT DOCUMENTS

| CN | 107167991 A | * | 9/2017 | |
| TW | 201307896 | | 2/2013 | |
| TW | 201307896 A | * | 2/2013 | |
| TW | M488073 | | 10/2014 | |
| TW | 201708887 | | 3/2017 | |
| TW | 202001344 | | 1/2020 | |
| WO | WO-2013118698 A1 | * | 8/2013 | .......... G02B 17/004 |

\* cited by examiner

FLOATING IMAGE DISPLAY DEVICE

CROSS-REFERENCE TO RELATED APPLICATION

This application claims the priority benefit of Taiwan application serial no. 111108367, filed on Mar. 8, 2022. The entirety of the above-mentioned patent application is hereby incorporated by reference herein and made a part of this specification.

BACKGROUND

Technical Field

The disclosure relates to a display device, and particularly relates to a floating image display device.

Description of Related Art

Along with advancement of display technology, floating image displays have been developed. Floating image display technology may be applied to various occasions. For example, a user may interact with a floating image to achieve certain operations of an electronic device. When interacting with the floating image, a finger of a user may move to a position of the floating image floated in the air without touching a surface of the display, thus causing no contamination of the finger or the surface of the display. This application situation may be applied in a kitchen to prevent bacteria or viruses on the surface of the display from contaminating food, or prevent food from contaminating the display.

On the other hand, along with the epidemic of coronavirus pneumonia, non-contact operations are gaining more and more attention. The floating image display used in collaboration with sensors may realize non-contact switches or virtual keys, such as floating virtual elevator buttons, floating virtual bell buttons or floating light switches, etc.

However, the floating image of a general floating image display has a trade-off limit between an image size and a floating height, i.e., the image will be cropped when the floating height exceeds the limit. In addition, another type of floating image display adopts two curved reflectors to reflect an image beam by multiple times to form a floating image, and the curved reflector in a light output direction has an opening in a center (i.e., at an optical axis), so that the image beam may be emitted out of the device and imaged outside the device. However, since the center of the reflector has the opening without functions of reflection and imaging, when the user's eyes are located on or near the optical axis, the floating image cannot be seen, and the user may see the floating image at a large viewing angle, which limits applicability of the floating image display.

SUMMARY

An embodiment of the disclosure provides a floating image display device configured to generate a floating image. The floating image display device includes an image module and at least one transflective optical element. The image module is configured to provide a first image. The transflective optical element includes a first reflective surface and a second reflective surface, where the first image is located between the first reflective surface and the second reflective surface, and each of the first reflective surface and the second reflective surface includes a curved surface and has no opening on an optical axis thereof. The second reflective surface is a transflective surface. The first reflective surface and the second reflective surface are configured to re-converge rays from the first image to form a second image, where the second image is a floating image.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
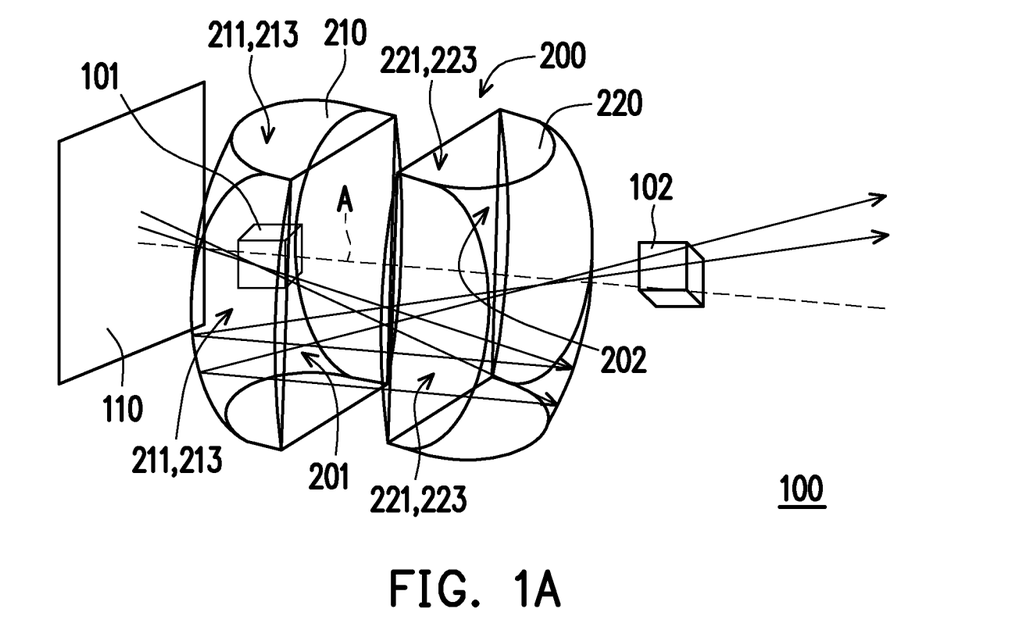
FIG. 1A is a schematic three-dimensional view of a floating image display device according to an embodiment of the disclosure.
Figure 1B:
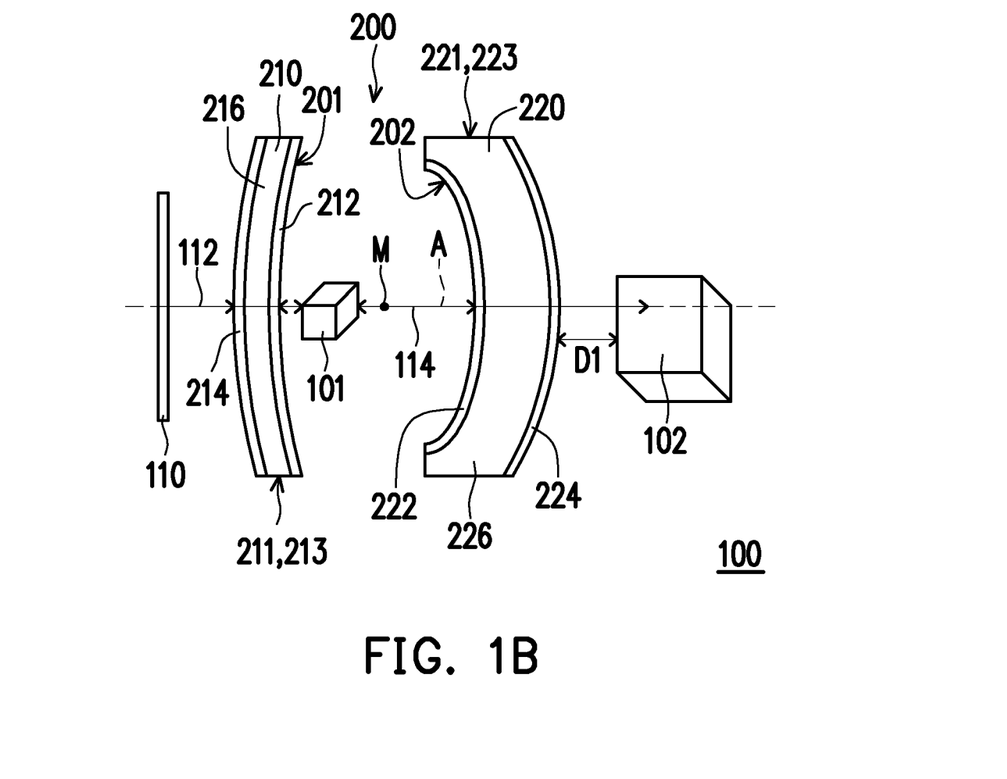
FIG. 1B is a schematic cross-sectional view of the floating image display device of FIG. 1A.

FIG. 1A is a schematic three-dimensional view of a floating image display device according to an embodiment of the disclosure, and FIG. 1B is a schematic cross-sectional view of the floating image display device of FIG. 1A. Referring to FIG. 1A and FIG. 1B, a floating image display device 100 of the embodiment is used to generate a floating image. The floating image display device 100 includes an image module 110 and at least one transflective optical element 200 (one transflective optical element 200 is taken as an example in FIG. 1A and FIG. 1B). The image module 100 is used for providing a first image 101. In the embodiment, the image module 100 is, for example, a real object, a flat-panel display, an integrated imaging display, a projector, a holographic display, a volumetric display, or other suitable displays, which is not limited by the disclosure.

The transflective optical element 200 includes a first reflective surface 201 and a second reflective surface 202, where the first image 101 is located between the first reflective surface 201 and the second reflective surface 202. Each of the first reflective surface 201 and the second reflective surface 202 includes a curved surface and have no opening on an optical axis A thereof. The second reflective surface 202 may be a transflective surface, and in this embodiment, the first reflective surface 201 may also be a transflective surface. The first reflective surface 201 and the second reflective surface 202 are configured to re-converge rays 114 from the first image 101 to generate a second image 102, and the second image 102 is a floating image. The first image 101 and the second image 102 may be planar images or three-dimensional images.

In the embodiment, the first reflective surface 201 is disposed between the image module 110 and the second reflective surface 202, and the image module 110 is configured to provide an image beam 112. The second reflective surface 202 is a transflective surface, which means that when the image beam 112 is transmitted to the second reflective surface 202, a part of the image beam 112 may pass through the second reflective surface 202, and the other part of the image beam 112 may be reflected by the second reflective surface 202. Similarly, the first reflective surface 201 is a transflective surface, which means that when the image beam 112 is transmitted to the first reflective surface 201, a part of the image beam 112 may pass through the first reflective surface 201, and the other part of the image beam 112 may be reflected by the first reflective surface 201. In an embodiment, a transmittance of the first reflective surface 201 and the second reflective surface 202 is, for example, about 50%, and a reflectance of the first reflective surface 201 and the second reflective surface 202 is, for example, about 50%. In the embodiment, after the image beam 112 passes through the first reflective surface 201, the first image 101 is formed between the first reflective surface 201 and the second reflective surface 202.

In the embodiment, the first reflective surface 201 and the second reflective surface 202 are paraboloids or paraboloid-like surfaces (i.e., surfaces close to paraboloids), and the rays 114 from the first image 101 converge and form the second image 102 outside the transflective optical element 200 after being reflected by the first reflective surface 201 and the second reflective surface 201 by multiple times. In the embodiment, the second reflective surface 202 is located between the first image 101 and the second image 102.

In the embodiment, the first reflective surface 201 and the second reflective surface 202 are continuous curved surfaces without openings. The transflective optical element 200 includes a first reflector 210 and a second reflector 220, and the first reflective surface 201 and the second reflective surface 202 are respectively two surfaces of the first reflector 210 and the second reflector 220 facing each other. In the embodiment, the second reflective surface 202 is formed by a continuous transflective film 222 without an opening, and the first reflective surface 201 is formed by a continuous transflective film 212 without an opening. In addition, in the embodiment, a concave surface of the transflective film 212 that forms the first reflective surface 201 and a concave surface of the transflective film 222 that forms the second reflective surface 202 face each other. In addition, in the embodiment, two surfaces of the first reflector 210 and the second reflector 220 facing away from each other may be provided with anti-reflective films 214 and 224. However, in other embodiments, the first reflector 210 and the second reflector 220 may not be provided with anti-reflective films.

In the embodiment, the first reflector 210 includes a light-transmitting material 216 that allows the image beam 112 to pass through, the second reflector 220 includes a light-transmitting material 226 that allows the rays 114 to pass through. The transflective film 212 and the transflective film 222 may be respectively disposed on two surfaces of the light-transmitting material 216 and the light-transmitting material 226 that face each other, and the anti-reflective film 214 and the anti-reflective film 224 may be respectively disposed on two surfaces of the light-transmitting material 216 and the light-transmitting material 226 that face away from each other.

In other embodiments, the transflective film 212 of the first reflective surface 201 and the transflective film 222 of the second reflective surface 202 may also be replaced by optical microstructures, and the optical microstructures also have the effects of partial penetration and partial reflection of the light beam 112 or the rays 114. In addition, the transflective films 212, 222 or the optical microstructures may have the same structure or different structures at a portion close to the optical axis A and a portion away from the optical axis A.

In the floating image display device 100 of the embodiment, the first reflective surface 201 and the second reflective surface 202 are used to make the rays 114 from the first image 101 to be reflected by multiple times inside the transflective optical element 200, so as to form the second image 102 (i.e., the floating image) outside the transflective optical element 200, where a floating distance D1 of the second image 102 (i.e., a distance between the second image 102 and the second reflector 220) is greater than 0, and the integrity of the second image 102 is maintained. In addition, the second reflective surface 202 may be a transflective surface, and the first reflective surface 201 and the second reflective surface 202 have no openings on the optical axis A, so that paraxial rays and abaxial rays may exist between the first reflective surface 201 and the second reflective surface 202, and when the user's eyes are on or near the optical axis A (i.e., at a central viewing angle), the user may still view the floating image (i.e., the second image 102), which may enhance applicability of the floating image display device 100. The floating image display device 100 of the embodiment may increase the floating distance D1, and a complete and uncropped floating image may be viewed at various viewing angles (including the central viewing angle and a large viewing angle), which may meet the application requirements of large viewing angles, so as to be applied to various carriers (such as public carriers) such as virtual buttons (for example, elevator buttons), advertising templates, road indicators or map models, etc.

In the embodiment, the first reflector 210 may have a straight trimming edge 211, and the second reflector 220 may have a straight trimming edge 221. In other words, a side surface of the first reflector 210 has a planar surface 213, and a side surface of the second reflector 220 has a planar surface 223. In this way, a volume of the transflective optical element 200 may be reduced without affecting the quality of the floating image, thereby reducing a volume of the floating image display device 100. Moreover, the trimming edges of the first reflector 210 and the second reflector 220 do not affect shape quality of the second image 102, but affects a brightness of the second image 102. Therefore, an area ratio of the second image 102 to the floating image display device 100 may be increased by adopting the edge trimming method.

An effective focal length of the first reflective surface 201 is, for example, within a range of 60 mm to 100 mm, and an effective focal length of the second reflective surface 202 is, for example, within a range of 10 mm to 50 mm, and a distance between the first reflective surface 201 and the second reflective surface 202 on the optical axis A is, for example, within a range of 20 mm to 60 mm. In the embodiment, the effective focal length of the first reflective surface 201 is, for example, 80.38 mm, the effective focal length of the second reflective surface 202 is, for example, 30.07 mm, and the distance between the first reflective surface 201 and the second reflective surface 202 on the optical axis A is, for example, 40 mm. In addition, at least part of the first reflective surface 201 and at least part of the second reflective surface 202 are circularly symmetrical, for example, the parts of the first reflective surface 201 and the second reflective surface 202 within a radius smaller than the straight trimming edge 221 are circularly symmetrical with respect to the optical axis A, and a shape thereof may be expressed by a following aspheric equation (Equation (1)):

$$Sag(r) = \frac{cr^2}{1 + \sqrt{1 - (1+k)c^2 r^2}} + a_2 r^2 + a_4 r^4 + a_6 r^6 + a_8 r^8 \quad \text{(Equation 1)}$$

Where r is a vertical distance between a point on an aspheric surface and the optical axis A; Sag(r) is a sag of the aspheric surface parallel to the optical axis A, i.e., a depth of the aspheric surface (i.e., a vertical distance between a point on the aspheric surface that is spaced from the optical axis A by a distance r and a tangent plane tangent to a vertex of the aspheric surface on the optical axis A), c is a curvature of the aspheric surface near the optical axis A; k is a conic constant; and a2, a4, a6 and a8 are respectively a 2nd, a 4th, a 6th and an 8th order aspheric coefficients. In an embodiment, c of the first reflective surface 201 is, for example, 0.0062 mm$^{-1}$, k is, for example, 0.6244, and a2, a4, a6 and a8 are, for example, 0, 8.94e-008, −3.16e-010 and 8.03e-013, respectively; c of the second reflective surface 202 is, for example, 0.0166 mm$^{-1}$, k is, for example, −2.1779, and a2, a4, a6 and a8 are, for example, 0, 4.14e-008, −5.46e-009, and 1.40e-011, respectively.

In other embodiments, at least part of the first reflective surface 201 and at least part of the second reflective surface 202 may also be elliptically symmetrical, for example, the first reflective surface 201 and the second reflective surface 202 are elliptically symmetrical with respect to the optical axis A at portions within a range where the radius is smaller than the straight trimming edge 221.

In the embodiment, the first image 101 may be located between the first reflective surface 201 and a midpoint m between the first reflective surface 201 and the second reflective surface 202 (as shown in FIG. 1B).

Figure 2:
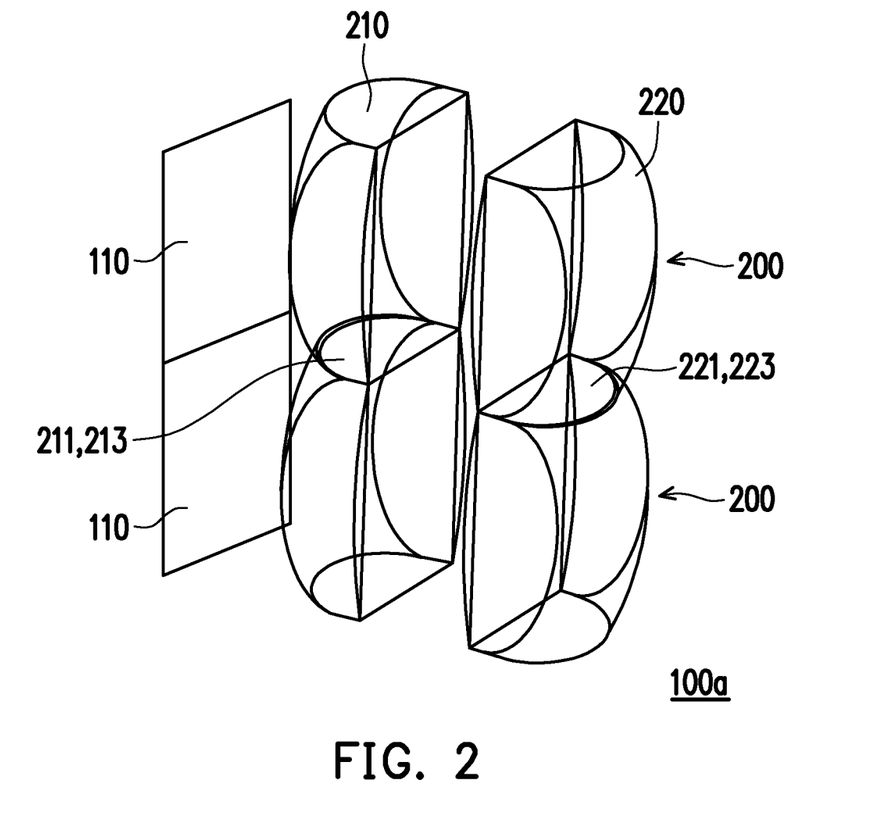
FIG. 2 is a schematic three-dimensional view of a floating image display device according to another embodiment of the disclosure.

FIG. 2 is a schematic three-dimensional view of a floating image display device according to another embodiment of the disclosure. Referring to FIG. 2, a floating image display device 100a of the embodiment is similar to the floating image display device 100 of FIG. 1A. The floating image display device 100a of the embodiment includes, for example, a plurality of transflective optical elements 200 arranged in a one-dimensional array. In these transflective optical elements 200, two adjacent first reflectors 210 may lean against each other through the straight trimming edges 211, i.e., through the planar surfaces 213, and two adjacent second reflectors 220 may lean against each other through the straight trimming edges 221, i.e., through the planar surfaces 223. In this way, the plurality of second images formed by the transflective optical elements 200 may be combined to form a larger floating image.

On the other hand, the floating image display device 100a may include a plurality of image modules 110 arranged in a one-dimensional array to respectively correspond to the transflective optical elements 200. However, in other embodiments, the floating image display device 100a may also include one image module 110, which covers a larger area, so as to respectively form a plurality of first images in the transflective optical elements 200.

Figure 3A:
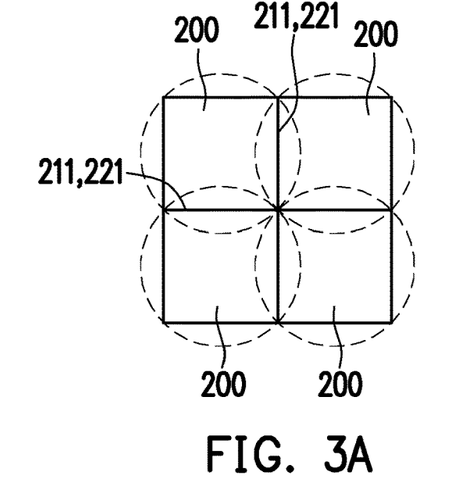
FIG. 3A, FIG. 3B and FIG. 3C are schematic front views of transflective optical elements viewing along an optical axis direction according to three embodiments of the disclosure.
Figure 3B:
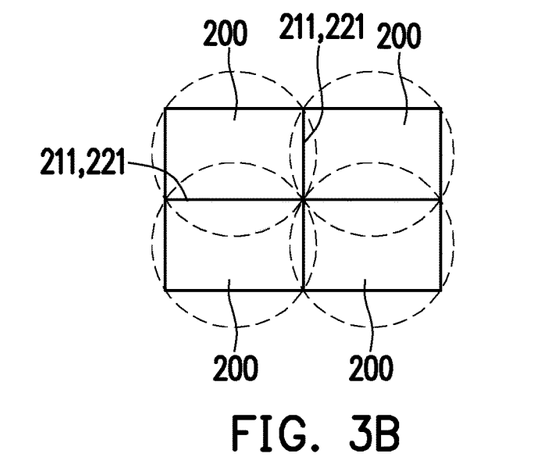
Figure 3C:
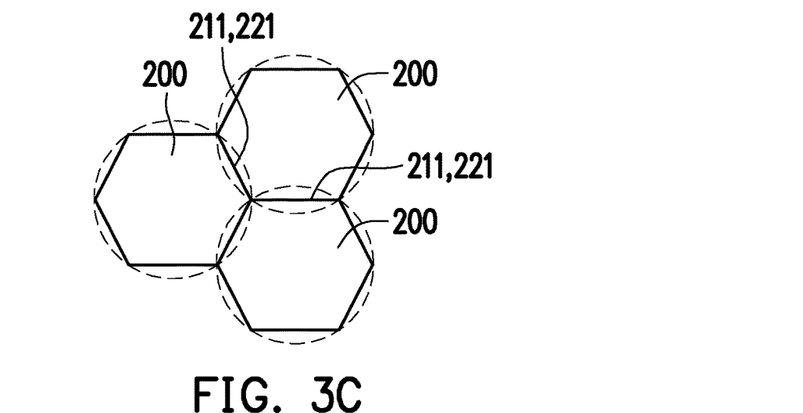

The disclosure does not limit the transflective optical elements 200 to be arranged in the one-dimensional array. In the embodiments of FIG. 3A, FIG. 3B and FIG. 3C, the transflective optical elements 200 may also be arranged in a two-dimensional array. FIG. 3A, FIG. 3B and FIG. 3C are schematic front views of transflective optical elements viewing along an optical axis direction according to three embodiments of the disclosure. In the embodiment of FIG. 3A, the first reflectors 210 and the second reflectors 220 of the transflective optical elements 200 respectively form square reflectors through the straight trimming edges 211 and 221, the adjacent first reflectors 210 lean against each other through the straight trimming edge 211, and the adjacent second reflectors 220 lean against each other through the straight trimming edge 221, so that these transflective optical elements 200 are arranged in a two-dimensional square array, and the corresponding image modules 110 may also be a plurality of image modules arranged in a two-dimensional square array, or may be one image module covering a larger area.

In the embodiment of FIG. 3B, the first reflectors 210 and the second reflectors 220 of the transflective optical elements 200 respectively form rectangular reflectors through the straight trimming edges 211 and 221, the adjacent first reflectors 210 lean against each other through the straight trimming edge 211, and the adjacent second reflectors 220 lean against each other through the straight trimming edge 221, so that these transflective optical elements 200 are arranged in a two-dimensional rectangular array, and the corresponding image modules 110 may also be a plurality of image modules arranged in a two-dimensional rectangular array, or may be one image module covering a larger area.

In the embodiment of FIG. 3C, the first reflectors 210 and the second reflectors 220 of the transflective optical elements 200 respectively form hexagonal reflectors through the straight trimming edges 211 and 221, the adjacent first reflectors 210 lean against each other through the straight trimming edge 211, and the adjacent second reflectors 220 lean against each other through the straight trimming edge 221, so that these transflective optical elements 200 are arranged in a two-dimensional polygonal array, and the corresponding image modules 110 may also be a plurality of image modules arranged in a two-dimensional polygonal array, or may be one image module covering a larger area. The disclosure does not limit a trimming shape and an array arrangement of the first reflectors 210 and the second reflectors 220 are symmetrical, which may be set according to actual needs of use.

Figure 4:
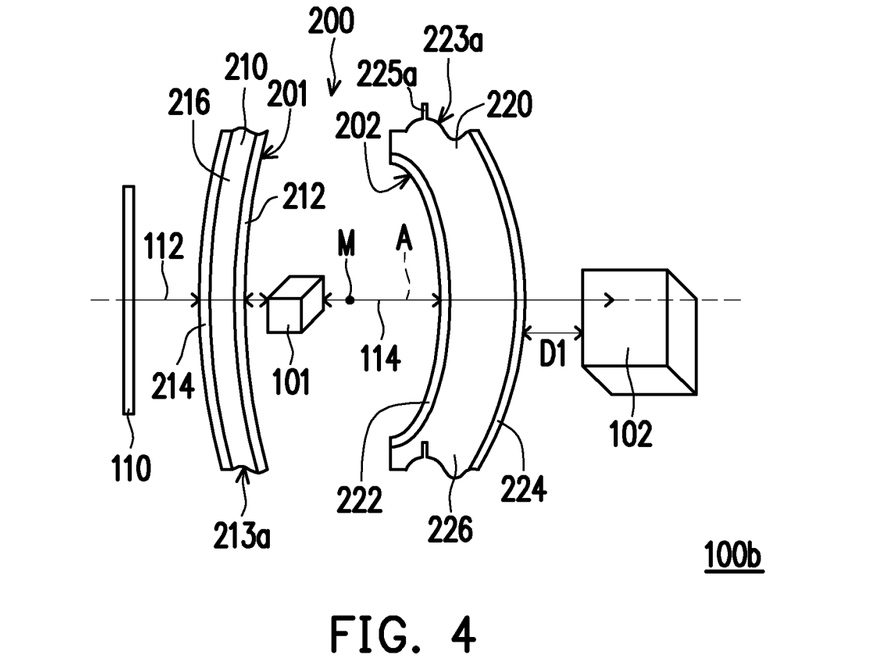
FIG. 4 is a schematic cross-sectional view of a floating image display device according to another embodiment of the disclosure.

FIG. 4 is a schematic cross-sectional view of a floating image display device according to another embodiment of the disclosure. Referring to FIG. 4, a floating image display device 100b of the embodiment is similar to the floating image display device 100 of FIG. 1B. In the floating image display device 100b of the embodiment, the side surfaces of the first reflector 210 and the second reflector 220 have a curved surface 213a, a curved surface 223a or a tenon structure 225a. For example, the side surfaces of the first reflector 210 and the second reflector 220 may have a curved surface and neither have a tenon structure, or the sides surfaces of the first reflector 210 and the second reflector 220 may have a tenon structure and have a curved surface or a planar surface, or a side surface of one of the first reflector 210 and the second reflector 220 has a tenon structure (as shown in FIG. 4). In an embodiment, when the floating image display device 100b has the transflective optical elements 200 arranged in a one-dimensional array or a two-dimensional array, the tenon structures help to fit the adjacent first reflectors 210 to each other, or fit the adjacent second reflectors 220 to each other to achieve a more stable structure.

Figure 5:
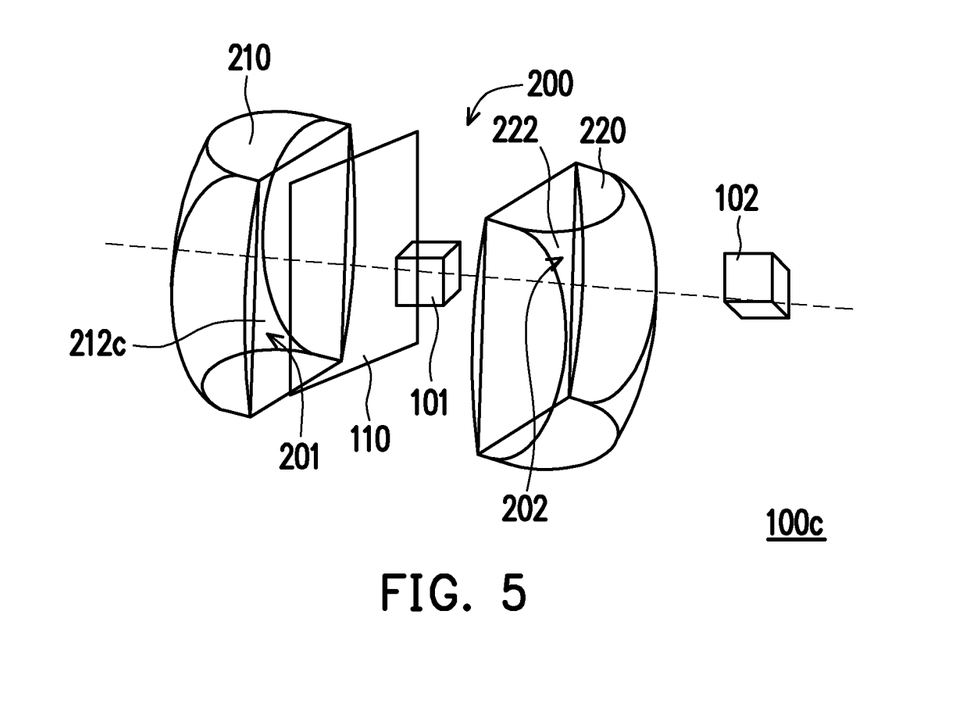
FIG. 5 is a schematic three-dimensional view of a floating image display device according to still another embodiment of the disclosure.

FIG. 5 is a schematic three-dimensional view of a floating image display device according to still another embodiment of the disclosure. Referring to FIG. 5, a floating image display device 100c of the embodiment is similar to the floating image display device 100 of FIG. 1A. In the floating image display device 100c of the embodiment, the image module 110 is located between the first reflective surface 201 and the second reflective surface 202, which may still generate the first image 101 located between the first reflective surface 201 and the second reflective surface 202, and the rays from the first image 101 form the second image 102 outside the transflective optical element 200 after being reflected by the first reflective surface 201 and the second reflective surface 202 by multiple times. In the embodiment, the first reflective surface 201 may be formed of a continuous reflective film 212c without an opening, and a concave surface of the reflective film 212c forming the first reflective surface 201 and a concave surface of the transflective film 222 forming the second reflective surface 202 face each other, where the reflective film 212c may reflect the rays from the first image 101 but prevent the rays from the first image 101 from passing through.

In the embodiment, the image module 110 is located between the first reflective surface 201 and the second reflective surface 202, which may reduce a volume of the floating image display device 100c and increase a brightness of the second image 102. In one embodiment, the first image 101 may also be located on the image module 110 without necessarily having a floating distance relative to the image module 110.

Figure 6:
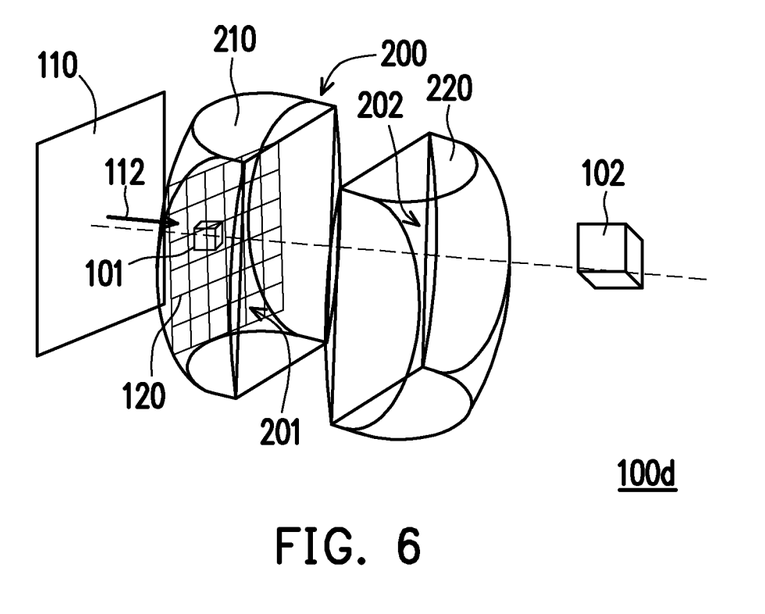
FIG. 6 is a schematic three-dimensional view of a floating image display device according to still another embodiment of the disclosure.

FIG. 6 is a schematic three-dimensional view of a floating image display device according to still another embodiment of the disclosure. Referring to FIG. 6, a floating image display device 100d of the embodiment is similar to the floating image display device 100 of FIG. 1A. The floating image display device 100d of the embodiment further includes an imaging medium 120 disposed between the first reflective surface 201 and the second reflective surface 202, where the image beam 112 emitted by the image module 110 is projected on the imaging medium 120 to form the first image 101 after passing through the first reflective surface 201. In other words, the imaging medium 120 may provide an effect similar to a projection screen, so that after the image beam 112 irradiates thereon, the first image 101 may be projected, which helps to make the first image 101 clearer and makes the user more suitable for viewing the second image 102. In the embodiment, the imaging medium 120 is, for example, a diffuser, a hologram, a nonlinear crystal, or other suitable imaging medium.

Figure 7:
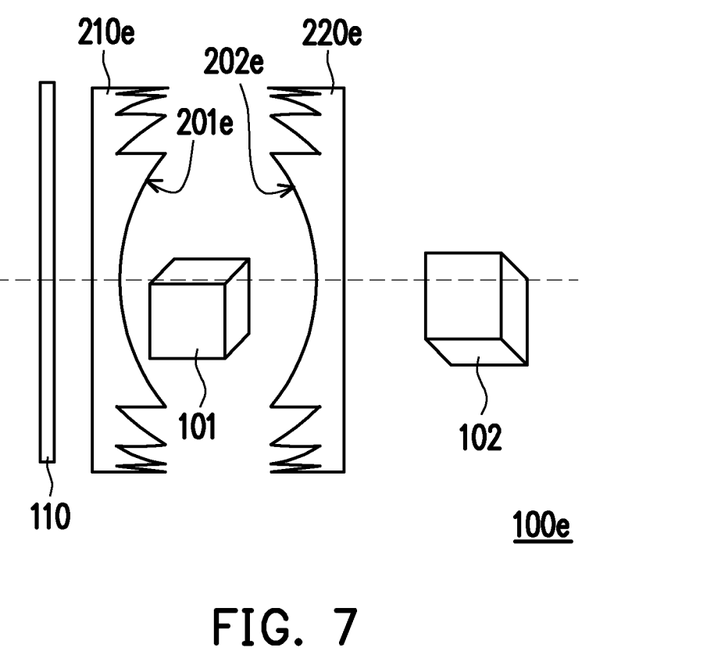
FIG. 7 is a schematic three-dimensional view of a floating image display device according to another embodiment of the disclosure.

FIG. 7 is a schematic three-dimensional view of a floating image display device according to another embodiment of the disclosure. Referring to FIG. 7, a floating image display device 100e of the embodiment is similar to the floating image display device 100 of FIG. 1A. In the floating image display device 100e of the embodiment, a first reflective surface 201e and a second reflective surface 202e may be Fresnel surfaces or metasurfaces, where the Fresnel surfaces are, for example, surfaces of Fresnel reflectors, which may effectively reduce thicknesses of the first reflector 210e and the second reflector 220e, thereby reducing a volume of the floating image display device 100e. In the embodiment, the first reflective surface 201e and the second reflective surface 202e are, for example, transflective surfaces. However, in other embodiments, the first reflective surface 201e may also be a reflective surface suitable for reflecting light but is not suitable for being penetrated by light.

In the floating image display device of the embodiment of the disclosure, the first reflective surface and the second reflective surface are used to reflect the rays from the first image by multiple times inside the transflective optical element, so as to form the second image (i.e. the floating image) outside the transflective optical element. A floating distance of the second image may be larger, and the integrity of the second image is maintained. In addition, the second reflective surface may be a transflective surface, and the first reflective surface and the second reflective surface have no openings on optical axes thereof. When the user's eyes are on or near the optical axis (i.e., at the central viewing angle), the user may still view the floating image, so that the applicability of the floating image display device may be improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A floating image display device, configured to generate a floating image, the floating image display device comprising:
    an image module, configured to provide a first image; and
    at least one transflective optical element, comprising a first reflective surface and a second reflective surface, wherein the first image is located between the first reflective surface and the second reflective surface, each of the first reflective surface and the second reflective surface comprises a curved surface and has no opening on an optical axis thereof, the second reflective surface is a transflective surface, the first reflective surface and the second reflective surface are configured to re-converge rays from the first image to form a second image, the second image is a floating image, an effective focal length of the first reflective surface is greater than an effective focal length of the second reflective surface, the second image is larger than the first image and is inverted relative to the first image, the first image is located between the first reflective surface and a midpoint between the first reflective surface and the second reflective surface, the second reflective surface is between the first reflective surface and the second image, the first reflective surface is disposed between the image module and the second reflective surface, the first reflective surface is a transflective surface, the image module is configured to provide an image beam, and the image beam forms the first image between the first reflective surface and the second reflective surface after passing through the first reflective surface.

2. The floating image display device as claimed in claim 1, further comprising an imaging medium disposed between the first reflective surface and the second reflective surface, wherein the image beam is projected on the imaging medium to form the first image after passing through the first reflective surface.

3. The floating image display device as claimed in claim 2, wherein the imaging medium is a diffuser, a hologram, or a nonlinear crystal.

4. The floating image display device as claimed in claim 1, wherein the first reflective surface and the second reflective surface are continuous curved surfaces without an opening.

5. The floating image display device as claimed in claim 1, wherein the transflective optical element comprises a first reflector and a second reflector, and the first reflective surface and the second reflective surface are respectively located on two surfaces of the first reflector and the second reflector facing each other.

6. The floating image display device as claimed in claim 5, wherein the second reflective surface is formed by a continuous transflective film without an opening, and the first reflective surface is formed by a continuous reflective film without an opening or a continuous transflective film without an opening.

7. The floating image display device as claimed in claim 6, wherein a concave surface of the reflective film or the transflective film forming the first reflective surface and a concave surface of the transflective film forming the second reflective surface face each other.

8. The floating image display device as claimed in claim 5, wherein the first reflector and the second reflector have straight trimming edges.

9. The floating image display device as claimed in claim 5, wherein side surfaces of the first reflector and the second reflector have a planar surface, a curved surface, or a tenon structure.

10. The floating image display device as claimed in claim 5, wherein anti-reflective films are provided on two surfaces of the first reflector and the second reflector facing away from each other.

11. The floating image display device as claimed in claim 1, wherein the second reflective surface is located between the first image and the second image.

12. The floating image display device as claimed in claim 1, wherein the at least one transflective optical element is a plurality of transflective optical elements arranged in a one-dimensional array or a two-dimensional array.

13. The floating image display device as claimed in claim 1, wherein the image module is a real object, a flat panel display, an integrated imaging display, a projector, a holographic display, or a volumetric display.

14. The floating image display device as claimed in claim 1, wherein the first reflective surface and the second reflective surface are paraboloids or paraboloid-like surfaces.

15. The floating image display device as claimed in claim 1, wherein the first reflective surface and the second reflective surface are Fresnel surfaces or metasurfaces.

16. The floating image display device as claimed in claim 1, wherein at least part of the first reflective surface and at least part of the second reflective surface are circularly symmetrical or elliptically symmetrical.

17. The floating image display device as claimed in claim 1, wherein an interval is between the transflective optical element and the second image, and the interval is along an optical axis of the transflective optical element and greater than zero.

* * * * *